United States Patent
Padiyar et al.

(10) Patent No.: US 12,437,293 B2
(45) Date of Patent: Oct. 7, 2025

(54) INTELLIGENT METHOD AND APPARATUS FOR SECURE PAYMENT TRANSACTION LEVERAGING ENVIRONMENT SENSING REAL-TIME SMART HASH CHAIN SENSORS

(71) Applicant: Bank of America Corporation, Charlotte, NC (US)

(72) Inventors: Sneha Padiyar, East Mumbai (IN); Sakshi Bakshi, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 187 days.

(21) Appl. No.: 18/232,091

(22) Filed: Aug. 9, 2023

(65) Prior Publication Data

US 2025/0053969 A1    Feb. 13, 2025

(51) Int. Cl.
*G06Q 20/38* (2012.01)
*G06Q 20/40* (2012.01)

(52) U.S. Cl.
CPC ..... *G06Q 20/3827* (2013.01); *G06Q 20/4014* (2013.01); *G06Q 20/407* (2013.01)

(58) Field of Classification Search
CPC .............................................. G06Q 20/00–425
See application file for complete search history.

(56) References Cited

U.S. PATENT DOCUMENTS

| | | | |
|---|---|---|---|
| 5,878,337 A | 3/1999 | Joao et al. | |
| 7,096,003 B2 | 8/2006 | Joao et al. | |
| 8,195,576 B1 | 6/2012 | Grigg et al. | |
| 8,380,622 B2 | 2/2013 | Bushman et al. | |
| 9,129,284 B2 | 9/2015 | Sarkissian et al. | |
| 9,235,841 B2 | 1/2016 | Joao | |
| 9,245,270 B2 | 1/2016 | Joao | |
| 10,861,020 B2 | 12/2020 | Joao | |
| 2017/0255938 A1* | 9/2017 | Biegun | G16Y 20/40 |
| 2019/0347648 A1 | 11/2019 | Look | |
| 2024/0289802 A1* | 8/2024 | Mendez Viera | G06Q 20/02 |

FOREIGN PATENT DOCUMENTS

| | | |
|---|---|---|
| CA | 2359651 C | 4/2006 |
| CN | 1653472 B | 5/2010 |

* cited by examiner

*Primary Examiner* — Mohammad A. Nilforoush

(74) *Attorney, Agent, or Firm* — Banner & Witcoff, Ltd.

(57) ABSTRACT

A real-time payment security method and system for preventing eavesdropping attacks on computing devices may include a plurality of sensors configured to detect anomaly-type behavior indicative of a security threat. The plurality of sensors may be configured to share data, and may be configured to eliminate false-positive anomaly-type behavior indicative of a security threat. The system and method may further include a hash chain network comprising a plurality of hash nodes, and a dynamic authentication mapper, wherein the dynamic authentication mapper may be powered by a cognitive artificial intelligence (AI) engine, and wherein the dynamic authentication mapper may be configured to generate a user notification of valid anomaly-type behavior indicative of a security threat thereby preventing an eavesdropping attack.

16 Claims, 4 Drawing Sheets

INTELLIGENT METHOD AND APPARATUS FOR SECURE PAYMENT TRANSACTION LEVERAGING ENVIRONMENT SENSING REAL-TIME SMART HASH CHAIN SENSORS

FIELD OF USE

The present disclosure relates to access control and security in the field of information security and, more particularly, to methods, systems, and apparatus using various smart hash chain sensors to identify threats in real-time and coordinating multiple security mechanisms among a plurality of entities, resources, or processes.

BACKGROUND

For any transaction, security and confidentiality are of extreme importance. Unfortunately, a user is at risk while conducting transactions from attacks such as visual and audio eavesdropping. As such, a one-time password (OTP) received on a computing device may be highly prone to attackers. Moreover, inadvertent visual or audio eavesdropping of a computing device such as a laptop, a tablet, a wrist or hand computer screen by a passerby or individual sitting next to an individual conducting a transaction on public transportation, on an airliner, at a bank, a shopping mall, etc., is a frequent breach of the individual's personal zone of privacy.

It would be advantageous for device users to utilize the Internet of Things (IoT) enabled dynamic sensor plugin disclosed herein as a dynamic method and system that can be integrated into any smart device or other computing device to identify threats in real-time while conducting a transaction thereby preventing an eavesdropping attack.

In particular, the dynamic sensor plugin method and system disclosed herein may include multiple IoT sensors linked together in a hash chain network. The hash chain networks may reconcile real-time sensor data with historical hash chain network data to ensure no suspicious threat activity, such as eavesdropping, is detected while a user is conduction a transaction on a device. Upon detection of an anomaly and related potential threat behavior, the real-time self-evolving application programming interfaces and related methods disclosed herein may alert the user and execute appropriate actions based upon the estimated severity of the threat.

SUMMARY

In light of the foregoing background, the following presents a simplified summary of the present disclosure in order to provide a basic understanding of various aspects of the disclosure. This summary is not limiting with respect to the exemplary aspects of the inventions described herein and is not an extensive overview of the disclosure. It is not intended to identify key or critical elements of the disclosure or to delineate the scope of the disclosure. Instead, as would be understood by a personal of ordinary skill in the art, the following summary merely presents some concepts of the disclosure in a simplified form as a prelude to the more detailed description provided below.

In one aspect of the disclosure, a real-time payment security system for preventing eavesdropping attacks on computing devices may include a plurality of sensors configured to detect anomaly-type behavior indicative of a security threat. In some examples, the plurality of sensors may be configured to share data, and may be configured to eliminate false-positive anomaly-type behavior indicative of a security threat. In another example, the system may further include a hash chain network comprising a plurality of hash nodes, and a dynamic authentication mapper, wherein the dynamic authentication mapper may be powered by a cognitive artificial intelligence (AI) engine, and wherein the dynamic authentication mapper may be configured to generate a user notification of valid anomaly-type behavior indicative of a security threat thereby preventing an eavesdropping attack.

In some examples, the system may be an Internet of Things (IoT) enabled dynamic sensor plugin. In other examples, the plurality of sensors may be a proximity sensor, an infrared sensor, a motion sensor, or an image sensor. In yet another example, the plurality of sensors may be configured to collect user parameters, wherein the hash chain network may be configured to cross-verify the user parameters. In still other examples, the hash chain network may further include a main checker node configured to verify the detected anomaly-type behavior indicative of a security threat is valid or invalid. In other examples, the AI engine may be configured to receive input from the main checker node, and wherein the input may include valid anomaly-type behavior indicative of a security threat. In another example, the dynamic authentication mapper may include a plurality of Application Programming Interfaces (APIs) configured to identify a required authentication level in response to the valid anomaly-type behavior indicative of a security threat. In other examples, the dynamic authentication mapper may be a real-time hashed mesh generated to identify the required authentication level in response to the valid anomaly-type behavior indicative of a security threat. In another example, the required authentication level in response to the valid anomaly-type behavior indicative of a security threat may be a switched mode of authentication, an audio warning, a blocked transaction, or a user reconfirmation.

In another aspect of the disclosure, a real-time payment security method for preventing eavesdropping attacks may include the steps of connecting a dynamic sensor plugin to a computing device, activating a plurality of sensors configured to detect anomaly-type behavior indicative of a security threat, detecting, by the plurality of sensors, that the anomaly-type behavior indicative of a security threat, verifying, by a hash chain network, that the anomaly-type behavior indicative of a security threat is valid, activating a dynamic authentication mapper configured to evaluate the valid anomaly-type behavior indicative of a threat for a spike in value data, evaluating, by the dynamic authentication mapper, a severity of the valid anomaly-type behavior indicative of a threat for the spike in value data, and generating, by the dynamic authentication mapper, a user notification of a threat including an additional required authentication level thereby preventing an eavesdropping attack.

In some examples, the plurality of sensors may include a proximity sensor, an infrared sensor, a motion sensor, or an image sensor. In other examples, the dynamic authentication mapper may be powered by a cognitive artificial intelligence (AI) engine. In another example, the hash chain network may further include a master checker node to verify the anomaly-type behavior indicative of a security threat is valid or invalid. In yet another example, the master checker node may activate the dynamic authentication mapper when the anomaly-type behavior indicative of a security threat is valid. In still other examples, the severity of the anomaly-type behavior indicative of a security threat may be determined by outlier value data collected by the plurality of sensors. In some examples, the dynamic authentication mapper may include a plurality of Application Programming Interfaces (APIs) configured to identify the required authentication level based upon the severity of the anomaly-type behavior. In yet other examples, the dynamic authentication mapper may be a real-time hashed mesh generated to identify the required authentication level. In still other examples, the required authentication level may be a switched mode of authentication, an audio warning, a blocked transaction, or a user reconfirmation. In some examples, the APIs may be trained to evolve with time and the severity of the anomaly-type behavior.

In yet another aspect of the disclosure, a real-time payment security process for preventing eavesdropping attacks may be implemented on a computer machine and the process may include the steps of activating a plurality of sensors that may be configured to detect anomaly-type behavior indicative of a security threat, detecting, by the plurality of sensors, that the anomaly-type behavior indicative of a security threat, verifying, by a hash chain network, that the anomaly-type behavior indicative of a security threat is valid, activating a dynamic authentication mapper configured to evaluate the valid anomaly-type behavior indicative of a threat for a spike in value data, evaluating, by the dynamic authentication mapper, a severity of the valid anomaly-type behavior indicative of a threat for the spike in value data, and generating, by the dynamic authentication mapper, a user notification of a threat that may include a required authentication level thereby preventing an eavesdropping attack.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
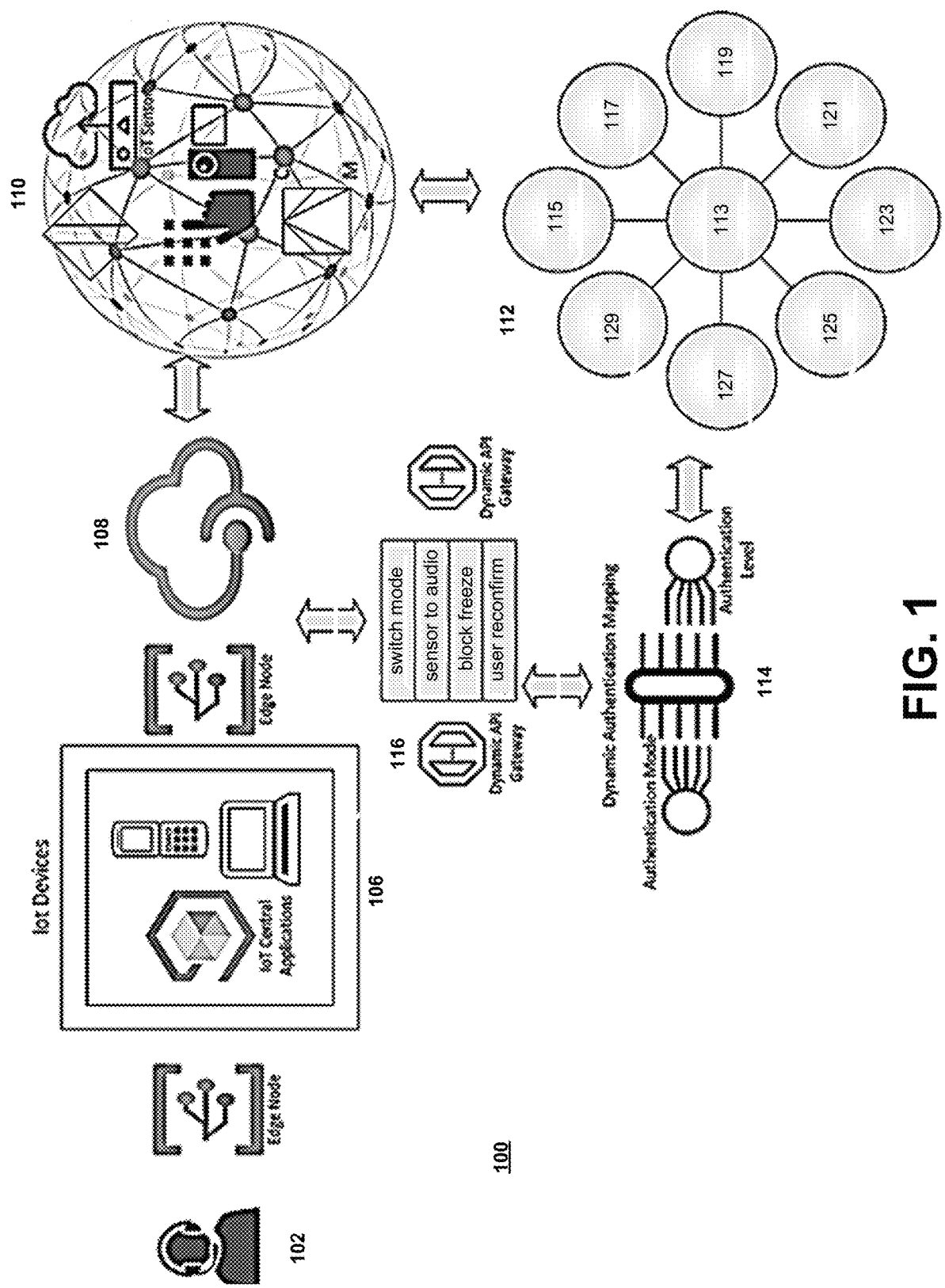
FIG. 1 depicts a sample, functional, architectural-block diagram showing sample interactions, steps, functions, and components of an intelligent method, system, or apparatus for securing payment or other transactions by leveraging environment sensing real-time smart hash chain sensors in accordance with one or more aspects described herein.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors, etc., for executing, accessing, controlling, implementing, etc., various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, devices, or the like are to be interpreted broadly as understood by skilled artisans. Further, as used in this specification, computers, machines, devices, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines, etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, blockchains, blocks, CRON functionality, daemons, databases, datasets, datastores, DeFi functionality, drivers, data structures, deep learning modules (e.g., knowledge graphs, NLP, LSTM, GAN, etc.), distributed ledgers, distributed-ledger blockchains, distributed-ledger hash chains dynamic rule engines, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), metadata, middleware, modules, namespaces, objects, operating systems, optimization modules, platforms, plugins, processes, protocols, programs, rejections, routes, routines, rule deployment modules, security, scripts, tables, tools, transactions, transformation functionality, user actions, user interface codes, utilities, web application firewalls (WAFs), web servers, web sites, etc.

The foregoing software, computer-executable instructions, data, modules, plugins, processes, routines, or the like can be on tangible computer-readable memory (local, in network-attached storage, be directly and/or indirectly accessible by network, removable, remote, cloud-based, cloud-accessible, etc.), can be stored in volatile or nonvolatile memory, and can operate autonomously, on-demand, on a schedule, spontaneously, proactively, and/or reactively, and can be stored together or distributed across computers, machines, or the like (e.g., in a decentralized network that may include a consortium of networks, entities, institutions, etc.) including memory and other components thereof. Some or all the foregoing may additionally and/or alternatively be stored similarly and/or in a distributed manner in the network accessible storage/distributed data/datastores/databases/big data/blockchains/distributed-ledger blockchains/distributed ledger hash chains/hash chain network/hashed mesh, etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol. Decentralized networks (e.g., DeFi networks), in particular, are included in the foregoing and are protected by the information-security aspects of this disclosure.

By way of introduction, aspects discussed herein relate to a dynamic system and method for maintaining personal and environmental privacy and security for a user conducting a transaction using a personal device. In crowded spaces, visual and audio eavesdropping is rampant and a real-time system and method, as disclosed herein, is needed to alert a user threat or attack while conducting a transaction. Accordingly, the system and method disclosed herein provides enhanced security measure against security threats thereby preventing an eavesdropping attack when a user is conducting a transaction using a personal device. Moreover, the dynamic system may be a plugin that can be connected to any computer, machine, or smart device that is connected to the web.

By way of non-limiting disclosure, FIG. 1 depicts a sample, functional, architectural-block diagram showing sample interactions, steps, functions, and components of intelligent system 100 for securing payment or other transactions by leveraging environment sensing real-time smart hash chain sensors in accordance with one or more aspects described herein. As previously noted, user 102 may use any device 104 connected to the internet/cloud 108. IoT enabled dynamic sensor plugin 110 is a smart system that may also be integrated in system 100 and integrated into any device. Dynamic sensor 110 may establish connections using edge gateway connectors and maybe linked only to metadata of the systems. Sensor(s) 110 may closely monitor the activity of users and environmental or surrounding details. For example, sensors 110 may monitor a room in which a user is employing a device. In some examples, dynamic sensor(s) 110 may include a proximity sensor, a motion sensor, an infrared sensor, and image sensor or combinations thereof. Dynamic sensor 110 may include other sensors known to those of skill in the art. Sensor(s) 108 provide multi-effective system data values that are averaged across time to ensure any spike in values is tracked. A spike in the data value identified by sensor(s) 110 may be an anomaly-type behavior that is indicative of a security threat, e.g., an eavesdropping-type attack.

Metadata output by sensors 110 is distributed to and verified by hash chain network 112. In some examples, hash chain network 112 may be a distributed e-ledger. Hash chain network 112 may include main checker node 113 and hash node ledger 115, 117, 119, 121, 123, 125, 127, 129, etc. Hash nodes convert sensor 110 output to make entries in the distributed e-ledgers. Hash node ledgers may reconcile data between nodes in a closed network to identify any gap or change in usual user surroundings or behavior while making the transaction to determine if the collected data is valid or a false positive value corresponding to suspicious activity. If a mismatch exists in the hash node ledger value, main checker node 113 is activated and flags the problematic hash node and main checker node 113 activates dynamic authentication mapper 114. Dynamic authentication mapper 114 will initiate authentication mode and initiate authentication level.

Dynamic authentication mapper 114 may include dynamic APIs 116 that are skeleton frameworks that may be customized and evolved based on the severity of a threat and the appropriate elevated user response required in view of the threat. The authentication level complexity is increased or elevated based upon severity of the data spike. Required user actions or response may be based on previous history, pre-defined modes, user inputs, prior courses of action, and combinations thereof. Dynamic API network 116 is configured to notify user 102 of the change of the mode of authentication to secure the transaction.

Dynamic authentication mapper 114 may perform a real-time evaluation to evaluate the severity of the identified threat based upon outliers in the change of sensor 110 data values. Dynamic authentication mapper 114 may be a real-time hashed mesh generated to identify the elevated level of user authentication. Dynamic authentication mapper 114 will also map to the corresponding mode of user authentication required for the transaction in view of the anomaly-type behavior indicative of a security threat to prevent an eavesdropping attack. Maker node marks the node while the checker mappers estimate the right severity of the difference to find the increase in authentication level of the user. Dynamic authentication mapper 114 may be powered by a cognitive artificial intelligence (AI) engine. Dynamic authentication mapper 114 may take input from hash chain network 112. Dynamic authentication mapper 114 may activate parameterized real-time and self-evolving (based upon historical data) Application Programming Interfaces (APIs) 116 to take appropriate action based on severity of the identified threat.

Dynamic APIs 116 may be skeleton frameworks that may be customized and evolved based on the severity of a threat and the appropriate elevated user response required in view of the threat. The authentication level complexity is increased or elevated based upon severity of the data spike. Required user actions or response may be based on previous history, pre-defined modes, user inputs, prior courses of action, and combinations thereof. Dynamic API network 116 is configured to notify user 102 of the change of the mode of authentication to secure the transaction. In some examples, the required authentication level may be a switched mode of authentication, an audio warning, a blocked transaction, or a user reconfirmation.

Figure 2:
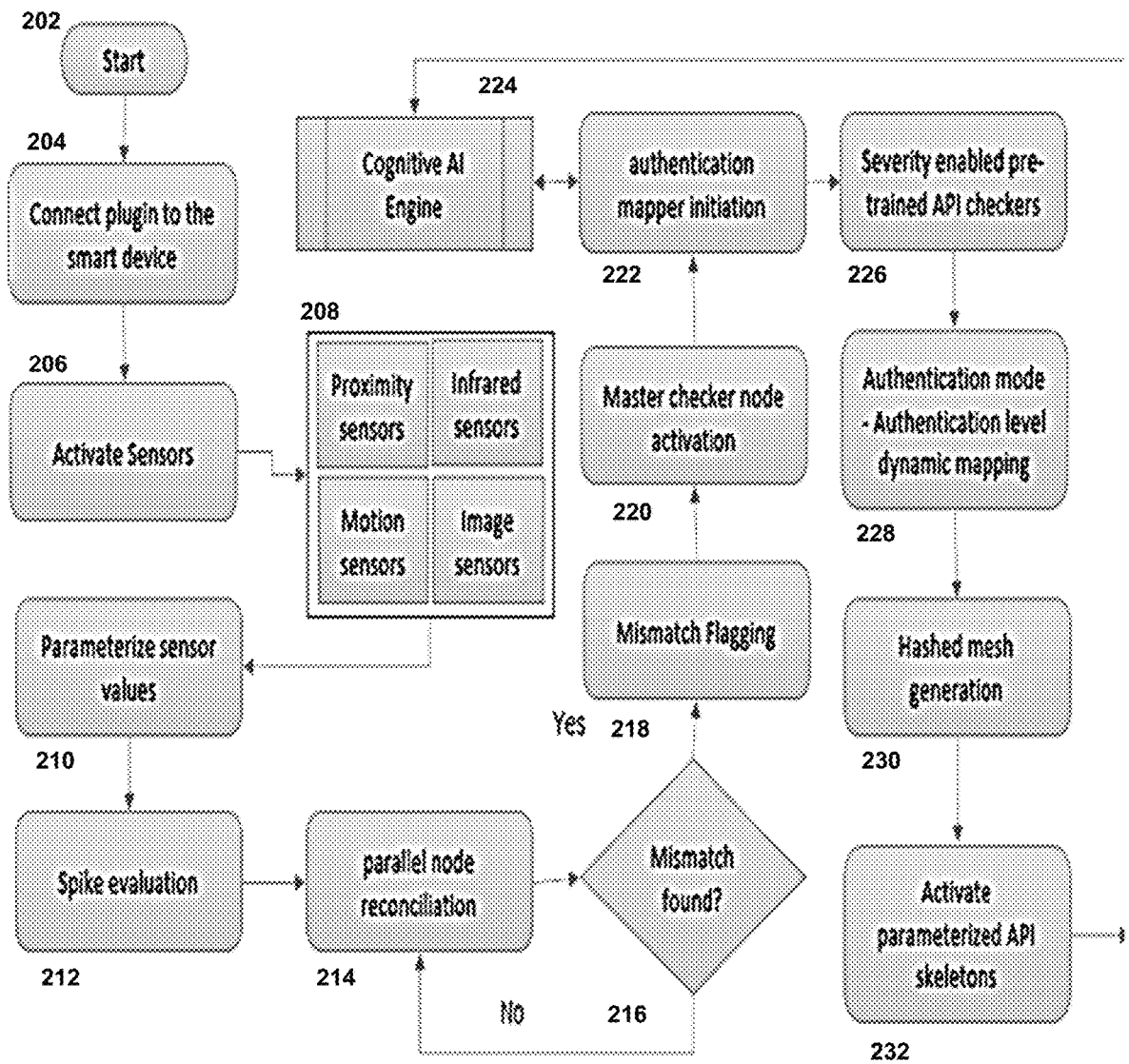
FIG. 2 depicts a sample, functional, flow diagram showing sample interactions, steps, functions, and components of an intelligent method, system, or apparatus for securing payment or other transactions by leveraging environment sensing real-time smart hash chain sensors to identify threats in accordance with one or more aspects described herein.
Figure 2:
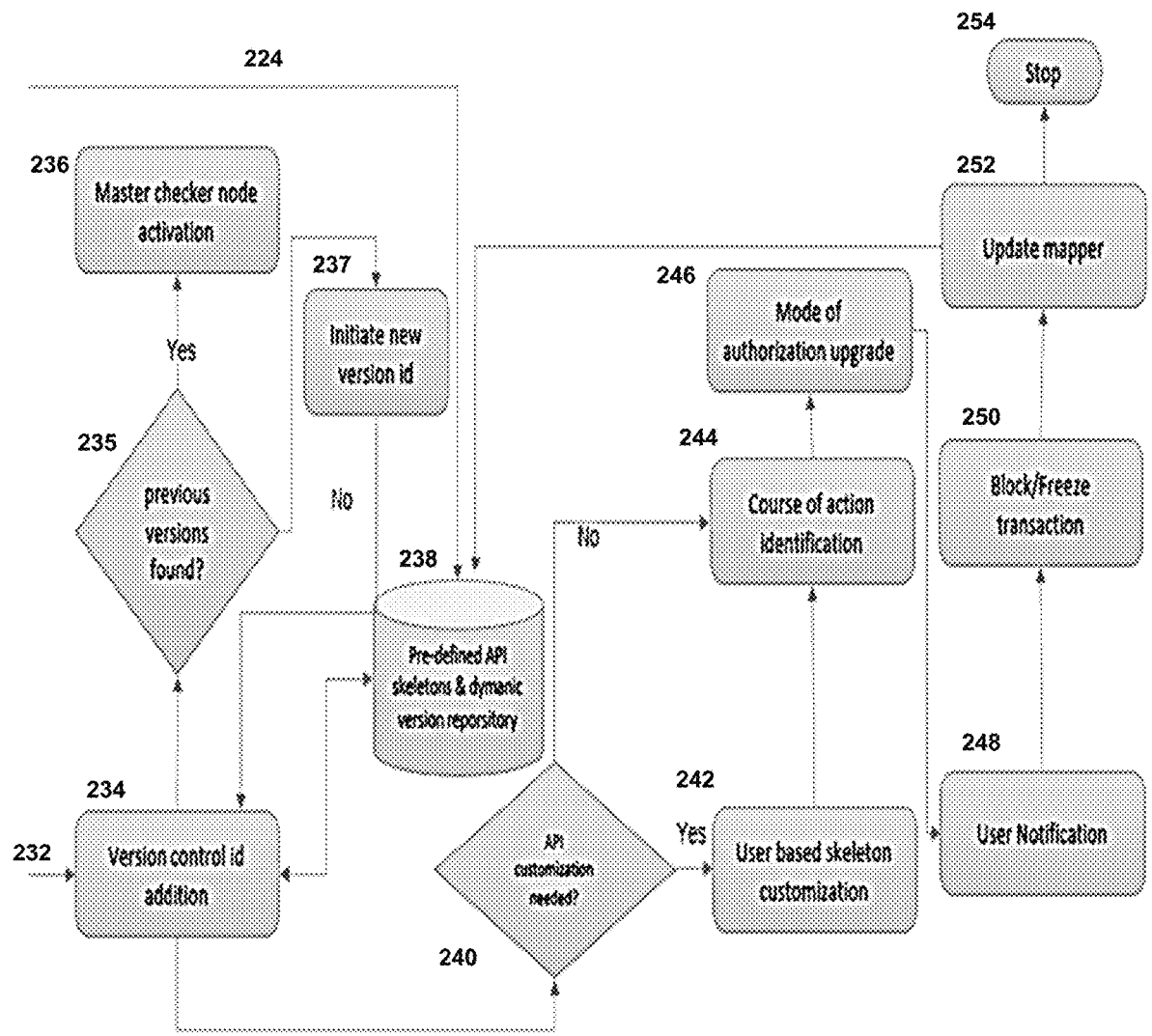

By way of non-limiting disclosure, FIG. 2 depicts an intelligent system for securing payment or other transactions by leveraging environment sensing real-time smart hash chain sensors to identify threats in accordance with one or more aspects described herein.

At step 202, a user initiates a transactions on a personal device that is connected to web.

At step 204, the dynamic system plugin is connected to the smart device. The plugin will monitor the user and the user's surroundings through highly sensitive IoT sensors which are interlinked through their outputs in a hash chain network.

At step 206, the sensors are activated to capture environmental and surroundings data. Inadvertent or intentional visual eavesdropping of a laptop, tablet, wrist or hand computer screen, etc. by an individual on a bus, in an airplane, at a financial center, bank, shopping mall, etc., is an often frequent breach of a user's privacy and financial security.

At step 208, the activated sensors may include a proximity sensor, an infrared sensor, a motion sensor, an image sensor, or combinations thereof. The activated sensors closely monitor the activity of users and surrounding details. Sensors provide multi-effective system values that are averaged across time to ensure any spike in values are tracked. A spike in values may be the result of collected sensor data indicative of anomaly-type behavior related to a possible security threat that is inconsistent with transactions made in a safe or normal environment.

At step 210, collected sensor metadata/values are parameterized and distributed to the hash chain network. Hash nodes of the hash chain network convert the sensor output to make entries in the distributed e-ledgers.

At step 212, parameterized metadata values are evaluated to identify a spike in collected sensor data to identify possible data indicative of anomaly-type behavior related to a possible security threat. As discussed above, the smart hash chain network is AI enabled to reconcile the metadata values not just within one node, but to adjacent nodes as well. This ensures redundant and multiple checks for any unexpected changes to surrounding parameter values across nodes.

At step 214, any spike in collected sensor metadata values are evaluated across parallel hash chain nodes to reconcile the spike value. The hashed nodes reconcile with each other to cross check any deviation in the values from any sensor.

At step 216, spike value mismatches are identified based upon nodes reporting reconciliation mismatches. The hash chain network reconciles subsequent node values with its own values to ensure no suspicious activity detected.

At step 218, the node reconciliation mismatches are flagged. The output threat flagging is cross verified real-time with multiple sensors.

At step 220, for any node reconciliation mismatches, the main checker mode is activated. As previously discussed, the main checker node is an AI-enabled smart node that flags any discrepancy and freezes the flagged node in addition to activating the real time IoT Mapper. The main checker node identifies the level of threat based on number of nodes reporting reconciliation mismatches which in turn determines the level-mode settings of the dynamic IoT mappers.

At step 222, the main checker mode activates the dynamic authentication mapper. As previously discussed, for any mismatch, the main checker node is activated to flag the problematic node and the dynamic authentication mapper is initiated.

At step 224, upon initiation, the authentication mapper is driven by a cognitive AI engine. The dynamic mapper performs evaluations in real-time to evaluate the severity of the threat based on outliers of change in spike values.

At step 226, the dynamic authentication mapper identifies the severity enabled pretrained, parameterized real time self-evolving API checkers to map the spike data and to take appropriate action based on severity of threat.

At step 228, the spike data is evaluated by the authentication mode and authentication level dynamic mapping is identified. The mode and level map together to identify which mode will get activated.

At step 230, the hashed mesh is generated.

At step 232, the parameterized API skeletons are activated. API skeletons are pre-defined API structures that are trained to evolve with time and severity. API skeletons track the version of the reconciliation and provides the option to the user to perform the right set of actions to the transactions. API skeletons will dynamically block and/or freeze the transaction until the user confirms to continue with the transaction.

At step 234, a version control identification is added to the API skeleton and saved at a dynamic version repository. The historical data or version is referenced in subsequent transactions to reference what severity level and what user course of action was determined from a prior event.

At step 235, the dynamic system determines if a previous version exists.

At step 236, the main checker node is activated if a previous version is found.

At step 237, the system will initiate a new version with a corresponding identification.

At step 238, the predefined API skeletons and respective data and versions is stored in a dynamic version repository.

At step 240, the API skeleton may be customized in view of a user's prior response.

At step 242, the customized user response based API skeleton is retrieved for use in determining a course of action.

At step 244, a course of action is identified. Again, the self-evolving API skeletons are trained to evolve with time and severity, and track the version of the reconciliation to provide the user a recommended course of action to perform in view of the threat behavior.

At step 246, the mode of authorization upgrade is determined in view of the particular threat and historical user data.

At step 248, a user notification is transmitted. The notification informs the user of any unwanted change in surroundings or user behavior and advises the user to change the mode of authentication, change the device with continued transaction, freeze or block the transaction, etc. based on the severity of the threat and prior user responses.

At step 250, the user chooses a course of action blocking or freezing the transaction thereby preventing the eavesdropping attack.

At step 252, the dynamic authentication mapper is updated with the user course of action. The user course of action for that event is stored at the predefined API skeleton and dynamic version repository for use in another transaction.

At step 254, the process is terminated.

Figure 3:
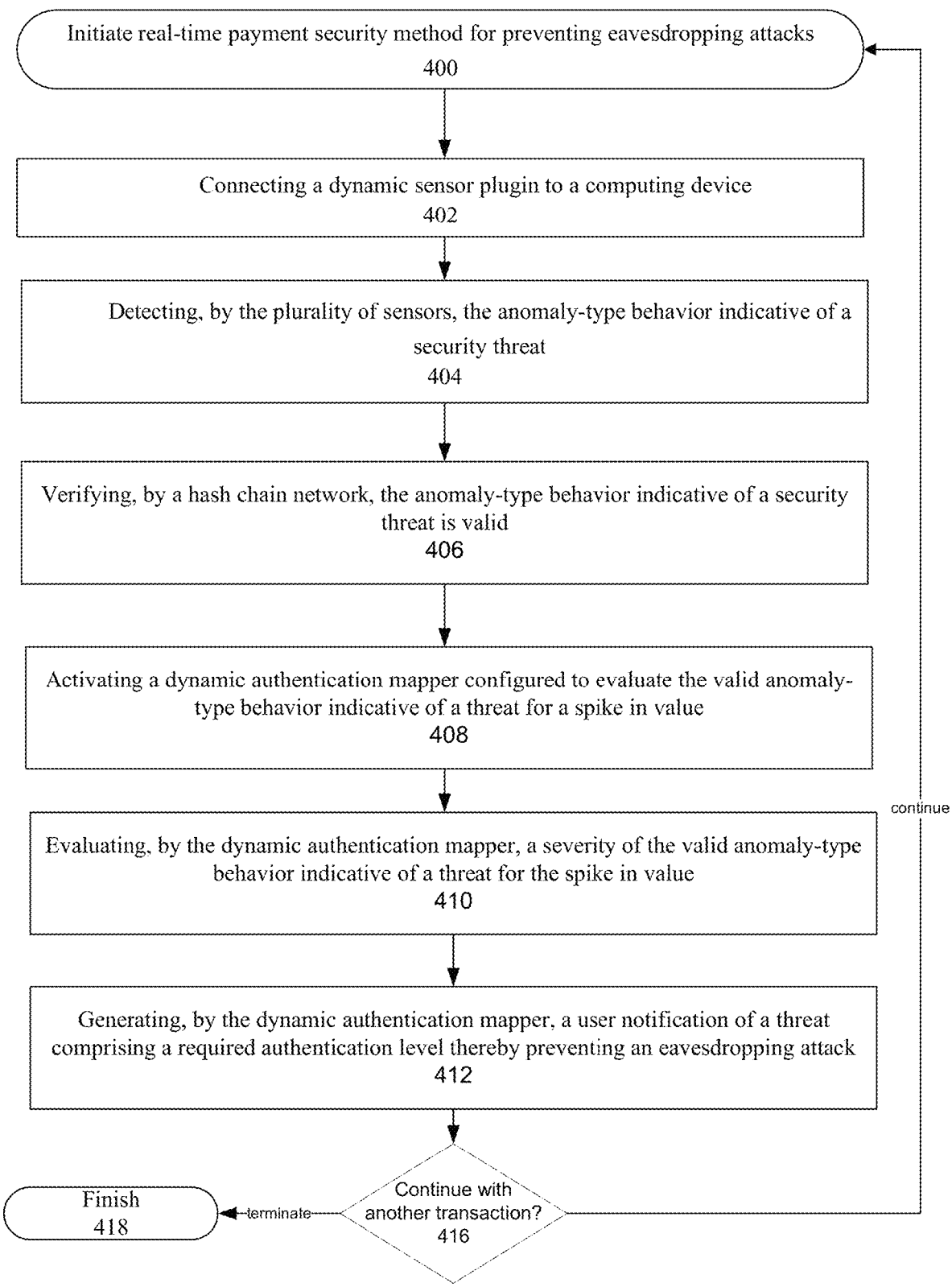
FIG. 3 depicts an intelligent method for securing payment or other transactions by leveraging environment sensing real-time smart hash chain sensors to identify threats in accordance with one or more aspects described herein.

By way of non-limiting disclosure, FIG. 3 depicts an intelligent method for securing payment or other transactions by leveraging environment sensing real-time smart hash chain sensors to identify threats in accordance with one or more aspects described herein.

A real-time payment security method for preventing eavesdropping attacks is shown and initiated at step 400 by a user making a transaction using a personal device.

At step 402, a dynamic sensor plugin disclosed herein is connected to a computing device.

At step 404, a plurality of sensors configured to detect anomaly-type behavior indicative of a security threat are activated and may detect anomaly-type behavior indicative of a security threat. In some examples, the threat may be a visual or audio eavesdropping attack while the user is conducting a transaction on their device. As previously discussed, the sensors may be a proximity sensor, an infrared sensor, a motion sensor, an image sensor, or combinations thereof.

At step 406, a hash chain network may verify the anomaly-type behavior that may be indicative of a security threat is valid.

At step 408, a valid data verified by the hash chain network leads to activation of a dynamic authentication mapper configured to evaluate the valid anomaly-type behavior indicative of a threat for a spike in value data. The spike in value data is evaluated to determine if the anomaly-type behavior indicative of a threat for the spike in value data is valid or invalid (a false positive).

At step 410, via the dynamic authentication mapper, a severity of the valid anomaly-type behavior indicative of a threat for the spike in value data is evaluated to determine a severity of the threat behavior.

At step 412, the dynamic authentication mapper may generate a user notification of a threat comprising a required authentication level thereby preventing an eavesdropping attack. The user notification, for example, may be a switched mode of authentication, an audio warning, a blocked transaction, a user reconfirmation, or combinations thereof.

At step 416, the real-time payment security method for preventing eavesdropping attacks may continue indefinitely in real time or at on-demand intervals for user transactions as desired 416, or otherwise terminated at 418 if preferred.

One or more aspects discussed herein may be embodied in computer-usable or readable data and/or computer-executable instructions, such as in one or more plugins, executed by one or more computers or other devices as described herein. Generally, plugin include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the plugin may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A real-time payment security system for preventing eavesdropping attacks comprising:
   a dynamic sensor plugin comprising a plurality of sensors configured to detect anomaly-type behavior indicative of a security threat, wherein the plurality of sensors are configured to share data, and wherein the plurality of sensors are configured to eliminate false-positive anomaly-type behavior indicative of a security threat;
   a hash chain network comprising:
      a first hash node comprising a first hash node processor and a first hash node memory;
      a plurality of second hash nodes each comprising a second hash node processor and a second hash node memory; and
      a master checker node comprising a master checker node processor and master checker node memory; and
   a computing device connected to the dynamic sensor plugin, the computing device comprising a computing device memory and a computing device processor, the computing device memory storing a dynamic authentication mapper, wherein the dynamic authentication mapper is powered by a cognitive artificial intelligence (AI) engine, and the computing device memory further computing device instructions which, when executed by the computing device processor, cause the computing device processor to perform operation of:
      activating, using the dynamic sensor plugin, the plurality of sensors to detect the anomaly-type behavior indicative of a security threat;
   wherein the plurality of sensors of the dynamic sensor plugin, after being activated by the computing device, are configured to:
      detect the anomaly-type behavior indicative of a security threat and generate data representing the anomaly-type behavior indicative of a security threat;
      broadcast, to the hash chain network, the generated data;
   wherein the first hash node memory comprises first hash node instructions which, when executed by the first hash node processor, causes the first hash node processor to perform the operations of:
      evaluating the generated data;
      identifying a spike value in the generated data;
   wherein each second hash node memory of each of the plurality of second hash nodes comprises second hash node instructions which, when executed by each second hash node processor of each of the plurality of second hash nodes, cause the second hash node processor to perform an operation of:

evaluating the generated data to reconcile the spike value in the generated data;

wherein the master checker node memory comprises master checker node instructions which, when executed by the master checker node processor, cause the master checker node processor to perform an operation of:

activating the dynamic authentication mapper; and wherein the computing device instructions, when executed by the computing device processor, further cause the computing device processor to perform operations of:

evaluating, using the dynamic authentication mapper, a severity of a valid anomaly-type behavior indicative of a threat for the spike in value data; and generating, using the dynamic authentication mapper, a user notification of a threat comprising a required authentication level thereby preventing an eavesdropping attack.

2. The real-time payment security system for preventing eavesdropping attacks of claim 1, wherein the plurality of sensors is a proximity sensor, an infrared sensor, a motion sensor, or an image sensor.

3. The real-time payment security system for preventing eavesdropping attacks of claim 2, wherein the plurality of sensors are configured to collect user parameters, wherein the hash chain network is configured to cross-verify the user parameters.

4. The real-time payment security system for preventing eavesdropping attacks of claim 1, wherein the AI engine is configured to receive input from the master checker node, and wherein the input comprises valid anomaly-type behavior indicative of a security threat.

5. The real-time payment security system for preventing eavesdropping attacks of claim 1, wherein the dynamic authentication mapper comprises a plurality of Application Programming Interfaces (APIs) configured to identify a required authentication level in response to the valid anomaly-type behavior indicative of a security threat.

6. The real-time payment security system for preventing eavesdropping attacks of claim 5, wherein the dynamic authentication mapper is a real-time hashed mesh generated to identify the required authentication level in response to the valid anomaly-type behavior indicative of a security threat.

7. The real-time payment security system for preventing eavesdropping attacks of claim 6, wherein the required authentication level in response to the valid anomaly-type behavior indicative of a security threat is a switched mode of authentication.

8. A real-time payment security method for preventing eavesdropping attacks comprising the steps of:

connecting a dynamic sensor plugin to a computing device;

activating, using the dynamic sensor plugin, a plurality of sensors configured to detect anomaly-type behavior indicative of a security threat;

detecting, by the plurality of sensors, the anomaly-type behavior indicative of a security threat and generating data representing the anomaly-type behavior indicative of a security threat;

broadcasting, by the plurality of sensors and to a hash chain network comprising a master checker node and a plurality of hash nodes, the generated data;

verifying, by the hash chain network, the anomaly-type behavior indicative of a security threat is valid, wherein verifying that the anomaly-type behavior indicative of a security threat is valid comprises:

evaluating, by one of the plurality of hash nodes, the generated data, identifying, by the one of the plurality of hash nodes, a spike value in the generated data, and evaluating, by others of the plurality of hash nodes, the generated data to reconcile the spike value in the generated data;

activating, by the master checker node, a dynamic authentication mapper configured to evaluate the valid anomaly-type behavior indicative of a threat for a spike in value data;

evaluating, using the dynamic authentication mapper, a severity of the valid anomaly-type behavior indicative of a threat for the spike in value data; and generating, using the dynamic authentication mapper, a user notification of a threat comprising a required authentication level thereby preventing an eavesdropping attack.

9. The real-time payment security method for preventing eavesdropping attacks of claim 8, wherein the plurality of sensors is a proximity sensor, an infrared sensor, a motion sensor, or an image sensor.

10. The real-time payment security method for preventing eavesdropping attacks of claim 8, wherein the dynamic authentication mapper is powered by a cognitive artificial intelligence (AI) engine.

11. The real-time payment security method for preventing eavesdropping attacks of claim 8, further comprising: verifying, by the master checker node, whether the anomaly-type behavior indicative of a security threat is valid or invalid.

12. The real-time payment security method for preventing eavesdropping attacks of claim 8, further comprising: determining a severity of the anomaly-type behavior indicative of a security threat by outlier value data collected by the plurality of sensors.

13. The real-time payment security method for preventing eavesdropping attacks of claim 12, wherein the dynamic authentication mapper comprises a plurality of Application Programming Interfaces (APIs) configured to identify the required authentication level based upon the severity of the anomaly-type behavior.

14. The real-time payment security method for preventing eavesdropping attacks of claim 13, wherein the dynamic authentication mapper is a real-time hashed mesh generated to identify the required authentication level.

15. The real-time payment security method for preventing eavesdropping attacks of claim 14, wherein the required authentication level is a switched mode of authentication, an audio warning, a blocked transaction, or a user reconfirmation.

16. The real-time payment security method for preventing eavesdropping attacks of claim 13, wherein the APIs are trained to evolve with time and the severity of the anomaly-type behavior.

\* \* \* \* \*